UNITED STATES PATENT OFFICE.

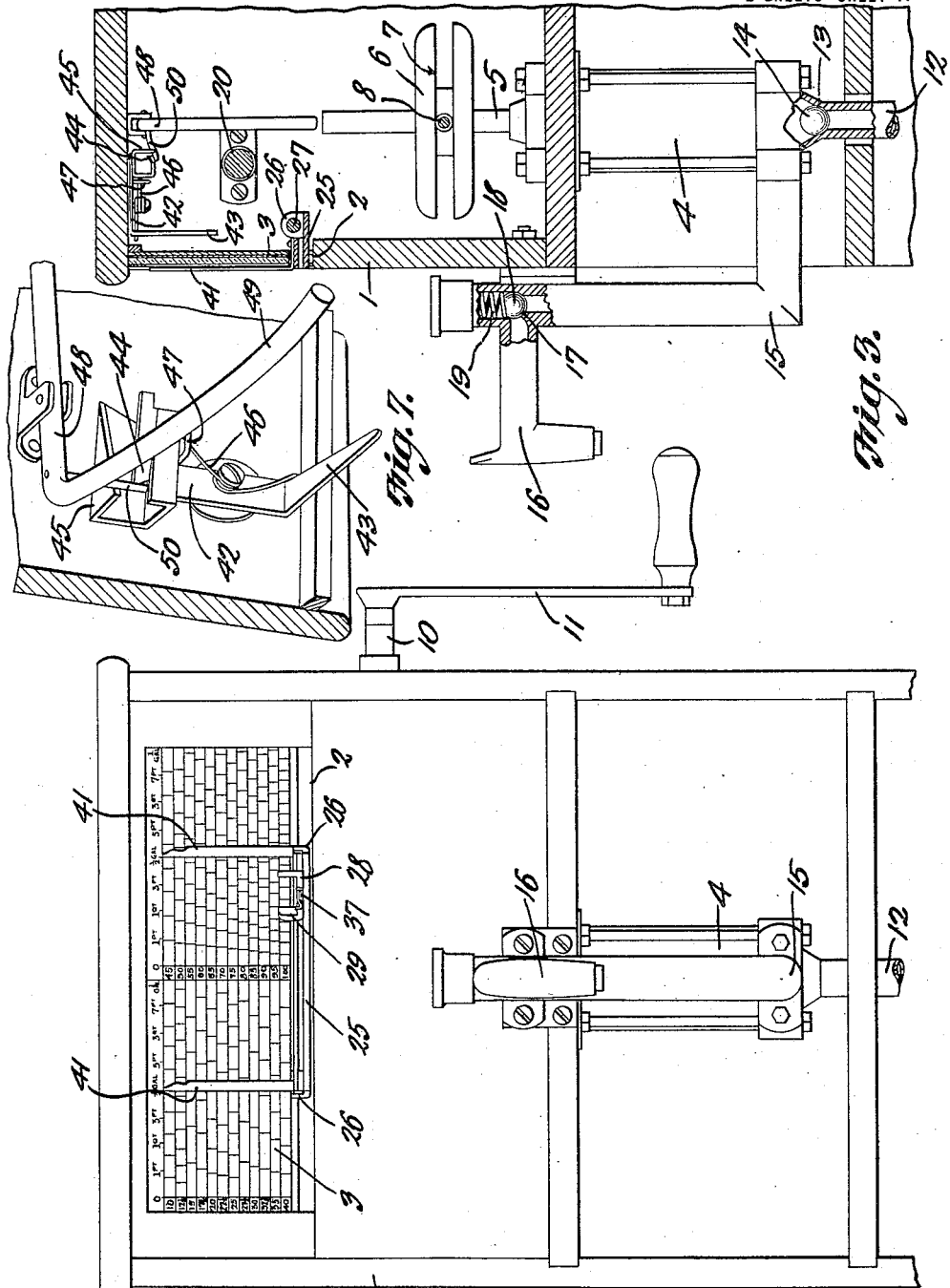

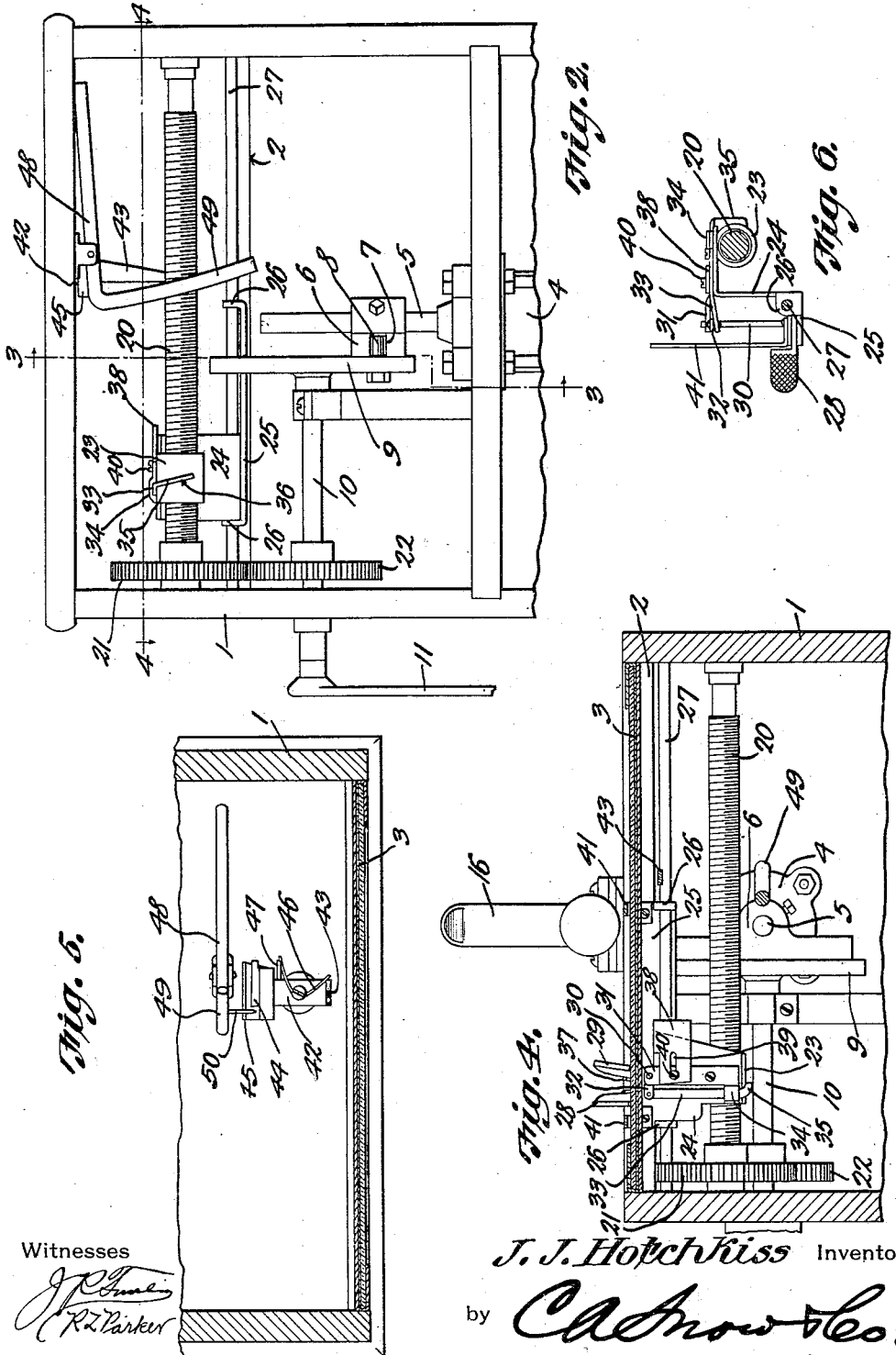

JOSEPH J. HOTCHKISS, OF RALEIGH, NORTH CAROLINA.

DISPENSING APPARATUS.

1,261,935.  Specification of Letters Patent.  Patented Apr. 9, 1918.

Application filed December 2, 1916.  Serial No. 134,654.

*To all whom it may concern:*

Be it known that I, JOSEPH J. HOTCHKISS, a citizen of the United States, residing at Raleigh, in the county of Wake and State of North Carolina, have invented a new and useful Dispensing Apparatus, of which the following is a specification.

This invention relates to apparatus for dispensing vinegar and other liquids in measured quantities, one of its objects being to provide simple and efficient means whereby the operation of the forcing mechanism will be automatically stopped when the predetermined amount of liquid has been discharged.

Apparatus of this type as heretofore constructed have usually been objectionable because it has been possible to eject therefrom more than the desired quantity, this being due to the fact that no means has been employed for automatically stopping the operation as soon as the desired amount has been dispensed. Obviously this has resulted in considerable loss of liquid not paid for by the purchaser.

One of the objects of the present invention is to provide simple, efficient and compact mechanism whereby a desired quantity of liquid can be accurately measured, there being novel means for indicating not only the selected quantity of liquid to be dispensed but also the price to be charged for said quantity at any given charge per unit of measure.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a front elevation of the apparatus.

Fig. 2 is a rear elevation of the upper portion thereof.

Fig. 3 is a section on line 3—3 Fig. 2.

Fig. 4 is a section on line 4—4 Fig. 2.

Fig. 5 is a bottom plan view of the locking dog and its switch mechanism.

Fig. 6 is a side elevation of the carriage, the feed screw being shown in section.

Fig. 7 is an inverted perspective view of the switch and locking dog.

Referring to the figures by characters of reference 1 designates a housing of any suitable configuration which may be placed upon a counter or the like. Extending within the front face of this housing is a slot 2 above which is arranged a chart 3 preferably divided into two sections which are coextensive, there being located at the left end of each section of the chart a column of numerals or the like designating different charges per unit of measure. For example, the characters belonging to the left hand section of the chart can range from 10 to 20 or more indicating ten cents to 20 cents per gallon or other unit of measure. Arranged along the top of each section of the chart are numerals indicating a unit of measure and fractions thereof. For example, if one gallon of liquid is capable of being dispensed at one operation of the apparatus, then the characters along the top of each section of the chart would designate one gallon and fractions thereof. The right hand section of the chart is used for carrying forward the values indicated on the left hand portion of the chart. Where the left hand portion indicates values up to 20 cents, then the characters in the end column of the right hand portion will indicate values ranging from 20 cents upwardly per unit of measure.

Arranged in the lower portion of the housing 1 is a pump 4 of any desired construction, the same being preferably of that type utilizing a reciprocating piston having a rod 5 extending therefrom. To this rod is attached a cross head 6 having a longitudinal slot 7 for the reception of a roller 8 outstanding from one face of an operating disk 9. Said disk is attached to a shaft 10 which projects through one wall of the housing and has a crank arm 11 or any other suitable means for actuating it. Thus it will be seen that the rotation of shaft 10 will result in the reciprocation of the piston rod 5. The cylinder of the pump is provided with an intake pipe 12 at the upper end of which is formed a seat 13 for a check valve 14 so that after fluid has been elevated into the cylinder or pump 4 it will not flow downwardly therefrom to the point of supply.

Extending from the bottom portion of the pump cylinder is an outflow tube 15 which opens into a discharge spout or nozzle 16 and arranged in the upper end of the tube 15 where it opens into the nozzle or spout 16 is a seat 17 for a check valve 18 which is preferably in the form of a ball held normally to its seat by a spring 19. This check valve serves to hold the apparatus primed so that liquid will begin to flow from the spout or nozzle 16 as soon as the pump begins its ejecting stroke.

Arranged above the shaft 10 and extending from one side to the other of the housing 1 is a feed screw 20 and secured to one end portion of this screw is a gear 21 adapted to receive motion from a gear 22 secured to shaft 10. A sleeve 23 is slidably mounted on the feed screw and secured to this sleeve is an angular bracket 24 which extends downwardly between the feed screw and the front of the housing 1 and is attached to or formed integral with a carriage 25. This carriage is located directly back of the slot 2 and has apertured ears 26 at its ends which are slidably mounted on a guide rod 27 which is back of and parallel with the slot 2. A finger piece 28 is fixedly connected to the carriage and extends through the slot 2. Another finger piece 29 extends through the slot and is attached to a vertical stem 30 mounted for rotation on the carriage 25 and in a bracket 31 extending from the upper portion of the angular bracket 24. A radial arm 32 extends from the upper portion of the stem and is pivotally connected to a slide 33 which is mounted on the upper portion of bracket 24 and works within a guide 34 provided therefor. Extending from the back end of the slide 33 is a depending finger 35 adapted to extend into a slot 36 formed in the back portion of sleeve 23. A spring 37 is interposed between the finger pieces 28 and 29 and serves to hold the finger piece 29 normally pressed away from the finger piece 28 with the result that the radial arm 32 normally pulls on the slide 33 and holds finger 35 pressed against the thread of feed screw 20. Therefore when this feed screw is rotated the carriage will be actuated thereby but, by pressing the finger piece 29 toward the finger piece 28, finger 35 will be pressed out of engagement with screw 20 and the entire carriage can thus be quickly shifted longitudinally of the feed screw.

A tripping plate 38 is mounted on the top portion of the bracket 24 and has a longitudinal slot 39 for the reception of a fastening screw 40 or the like. Thus this plate can be adjusted relative to the bracket 24 so as to extend a desired distance beyond one side thereof.

Attached to the front or outer portion of the carriage are two pointers or indexes 41 adapted to work across the exposed face of the chart 3, these pointers having straight edges extending from top to bottom of the chart and being adapted to indicate units of measure or fractions thereof or price to be charged for the indicated amount. The two pointers are spaced apart a distance equal to one half the width of the chart so that when one of the pointers occupies the zero position on one half of the chart, the other pointer will occupy the corresponding position on the other half of the chart.

Pivotally connected to the top of the housing or to any other structure overhanging the carriage and its feed screw is a lever 42 having a depending finger 43 at one end which projects into the path of the tripping plate 38. Connected to the other end of the lever is a switch consisting of a box-like structure open at its ends and the bottom of which is formed with a spring tongue 44 extending along one side thereof. A substantially triangular shifting flange 45 extends downwardly from the top of the switch to a point close to the free end of the spring tongue 44. A spring 46 is connected to the lever 42 and serves to hold it normally pressed against a stop 47 so that the switch is thus held normally parallel with the feed screw 20.

A locking lever 48 is pivotally mounted adjacent the switch and has one end downturned as at 49 while the opposed arm of the lever constitutes a weight for holding this downturned end normally elevated and in a substantially vertical position. Lever 48 is so located and shaped that when the downturned portion 49 is in its elevated position, it will lie directly above and in alinement with the piston rod 5 so that elevation of the rod will be prevented.

A pin 50 is extended laterally from the lever 48 adjacent the downturned portion 49 and is adapted to lie between the flange 45 and the bottom of the switch when the parts are not in use, thus holding the lever 48 tilted and with its downturned portion 49 removed from the path of the piston rod 5. This position of the parts has been illustrated in Fig. 7.

Assuming that it is desired to dispense an amount of liquid equal to that indicated by the highest character on the chart, which is the maximum capacity of the apparatus at one operation, the operator grasps the two finger pieces 28 and 29 and presses the finger piece 29 toward the finger piece 28 to disengage finger 35 from the feed screw 20. The carriage is then shifted longitudinally to bring the pointers to the graduations indicating the unit of measure selected. During this operation the lever 48 and its holding mechanism remains in the position illustrated in Fig. 7. Upon completion of the adjustment described the operator rotates shaft 10 so that motion is transmitted to the feed screw and to the pump piston. Liquid is promptly ejected from the nozzle 16 by the reciprocating piston and the carriage 25 moves gradually along its guide rod 27 and the feed screw 20. As soon as the pointers 41 reach the zero graduations on the chart, the tripping plate 38 pushes the depending finger 43 so as to swing lever 42 and cause the spring tongue 44 to pass over pin 50. Thus the pin will be held depressed until the limit of movement of the carriage is reached whereupon the switch will pass from above the pin 50 and the weighted arm of lever 48 will cause the depending portion 49 to swing into position above the piston rod 5. Said rod will therefore be held against further movement and no more liquid can be dispensed until the carriage is pulled away from the finger 43. As soon as said finger is released spring 46 will return lever 42 and the switch to their initial positions, the lower inclined edge of the flange 45 deflecting the pin 50 downwardly until it is brought to position beyond the free end of the spring tongue 44 and until the portion 49 is shifted out of the path of the piston rod.

When less than the unit of measure is to be dispensed, the pointers are started at the graduations indicating the fraction of said unit to be dispensed, after which the operation hereinbefore described is repeated.

What is claimed is:—

1. In liquid dispensing apparatus, the combination with liquid forcing means including a reciprocating element, of an indicating means, means for shifting the same and operating the liquid forcing means simultaneously, a normally inactive gravity operated lever, and means controlled by the movement of the indicating means for automatically releasing the inactive lever to gravitate into line with and lock the liquid forcing means against movement when said indicating means reaches a predetermined position.

2. In liquid dispensing apparatus, the combination with liquid forcing means, of a feed screw, means for simultaneously actuating the feed screw and the liquid forcing means, a carriage slidably mounted on the feed screw, relatively fixed and movable finger pieces upon the carriage, a screw engaging element upon the carriage, means operated by the movable finger piece for disengaging said element from the feed screw, an indicator movable with the carriage, and means controlled by the carriage when brought to a predetermined position, for locking the liquid forcing means against movement.

3. In liquid dispensing apparatus, the combination with liquid forcing means including a reciprocating element, of a lever having a downwardly extending portion, a movable switch including a resilient tongue and a deflecting flange above the tongue, means upon the lever and normally engaging the flange to hold the depending portion of the lever out of the path of the reciprocating element, and means for shifting the switch to release the lever.

4. In liquid dispensing apparatus, the combination with liquid forcing means including a reciprocating element, of a lever having a downwardly extending portion, a movable switch including a resilient tongue and a deflecting flange above the tongue, means upon the lever and normally engaging the flange to hold the depending portion of the lever out of the path of the reciprocating element, a carriage, an indicator carried thereby, means for simultaneously shifting the carriage and actuating the liquid forcing means, and adjustable means upon the carriage for shifting the switch to release the lever.

In testimony that I claim the foregoing as my own, I have hereto affixed my signature in the presence of two witnesses.

JOSEPH J. HOTCHKISS.

Witnesses:
 Ivy E. Simpson,
 Philomena A. Rockelli.

Copies of this patent may be obtained for five cents each, by addressing the "Commissioner of Patents, Washington, D. C."